(12) United States Patent
Fuldseth et al.

(10) Patent No.: US 7,509,553 B2
(45) Date of Patent: Mar. 24, 2009

(54) INTER-NETWORK AND INTER-PROTOCOL VIDEO CONFERENCE PRIVACY METHOD, APPARATUS, AND COMPUTER PROGRAM PRODUCT

(75) Inventors: Arild Fuldseth, Oslo (NO); Tom-Ivar Johansen, Oslo (NO); Andreas Kaljord, Oslo (NO); Steinar Midtskogen, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 1164 days.

(21) Appl. No.: 10/699,850

(22) Filed: Nov. 4, 2003

(65) Prior Publication Data
US 2004/0168110 A1 Aug. 26, 2004

Related U.S. Application Data

(60) Provisional application No. 60/423,393, filed on Nov. 4, 2002.

(51) Int. Cl.
*G06F 11/00* (2006.01)
*H04L 1/00* (2006.01)
(52) U.S. Cl. .................................. 714/747; 375/240.16
(58) Field of Classification Search .................. 714/746, 714/747; 375/240.16, 240.13, 240.27
See application file for complete search history.

(56) References Cited

U.S. PATENT DOCUMENTS 6,594,790 B1 * 7/2003 Sato et al. ................... 714/746
2002/0126757 A1 9/2002 Kim et al.

FOREIGN PATENT DOCUMENTS

| EP | 0 763 944 | 3/1997 |
|----|-----------|--------|
| EP | 1 081 963 | 3/2001 |
| WO | 02/071639 | 9/2002 |

OTHER PUBLICATIONS

Telenor Research Definition of an error concealment model (TCON): ITU-TS SG15; Working Party 15/1; Expert's Group For Very LowBitrate Visual Telephony, Boston (20-23) Jun. 1995; pp. 1-3.
Thomas Stockhammer, et al. "H.26L Simulation Results for Common Test Conditions for RTP/IP over 3GPP/3GPP2"; VCEG-N38; ITU—Telecommunications Standardization Sector; Fourteenth Meeting: Santa Barbara, CA, USA, Sep. 21-24, 2001; pp. 1-4.
Stephan Wenger, et al. Scattered Slices: A New Error Resilience Tool for H. 26L; JVT-B027; Joint Video Team (JVT) of ISO/IEC MPEG & ITU-T VCEG (ISO/IEC JTC1/SC29/WG11 and ITU-T SG16 Q.6); $2^{nd}$ Meeting: Geneva, CH, Jan. 29-Feb. 1, 2002; pp. 1-11.
Yao Wang, et al. "Error Control And Concealment For Video Communication: A Review". Proceedings of the IEEE, May 1998, vol. 86, No. 5, pp. 974-997.
W. Keck, "A Method For Robust Decoding Of Erroneous MPEG-2 Video Bitstreams". IEEE Transactions on Consumer Electronics, Aug. 1996, vol. 42, No. 3, pp. 411-421.
K. Stuhlmuller, et al. "Analysis Of Video Transmission Over Lossy Channels". IEEE Journal on Selected Areas in Communications, Jun. 2000, vol. 18, No. 6, pp. 1012-1032.

* cited by examiner

*Primary Examiner*—Guy J Lamarre
(74) *Attorney, Agent, or Firm*—Oblon, Spivak, McClelland, Maier & Neustadt, P.C.

(57) ABSTRACT

A system, apparatus, method, and computer program product for detecting and correcting packet losses that adversely affect video quality. This packet loss feature may be employed as part of the secure video conference system, method and computer program product, or be employed in a non-secure system, method and computer program product.

17 Claims, 16 Drawing Sheets

Concealment using motion vector data from a previous frame

Packet Loss Scenario

Packet loss propagation for Inter and Intra blocks

Conventional Concealment with no motion vector estimation

Prior Art

Conventional Concealment combining a Lost Block's Motion Vector Data with Video Data from a Corresponding Block of a Previous Frame Prior Art

Figure 5 - Motion Vector Estimation From a Neighbor Block in a Current Frame

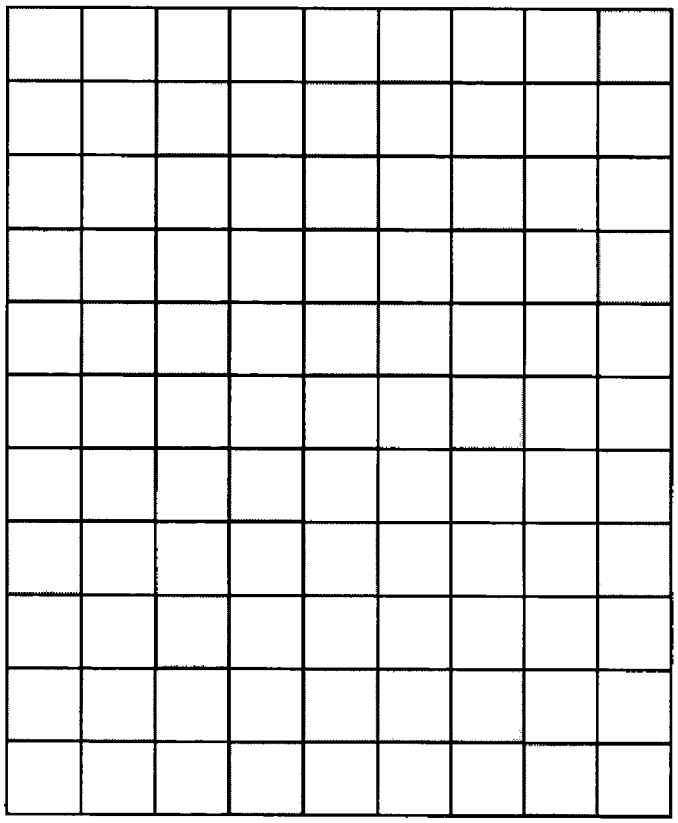
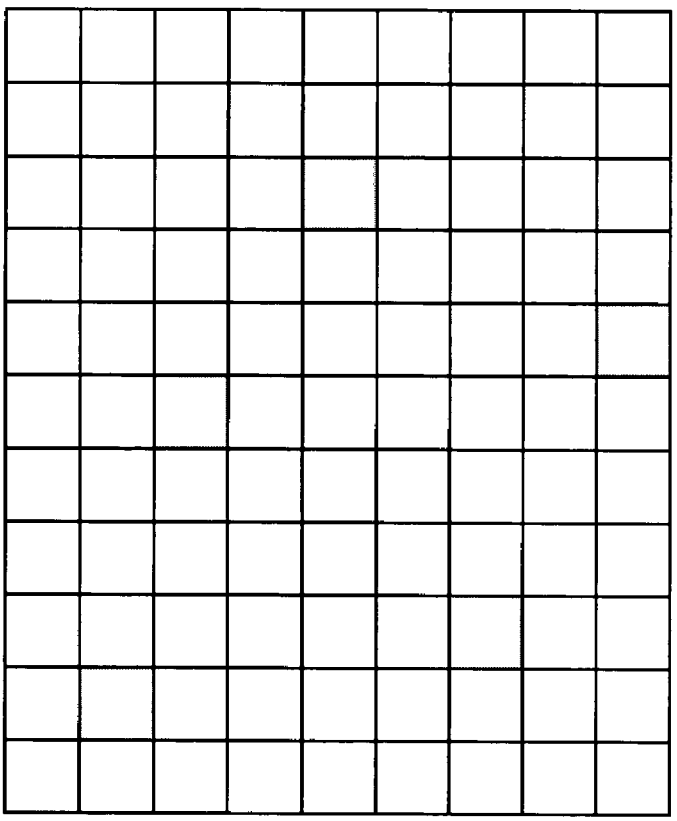
 
807 Intra block 809 Inter block
FIGURE 7
Intra and Inter blocks in
normal and robust mode Concealment using motion vector data from a previous frame

INTER-NETWORK AND INTER-PROTOCOL VIDEO CONFERENCE PRIVACY METHOD, APPARATUS, AND COMPUTER PROGRAM PRODUCT

CROSS REFERENCE TO RELATED APPLICATIONS

The present patent application is related and claims priority to provisional U.S. application 60/423,393 filed on Nov. 4, 2002. The present application is also related to U.S. patent application Ser. No. 08/108,839, now U.S. Pat. No. 5,329,608, filed on the same day as the present application. The entire contents of both provisional U.S. application 60/423,393 and co-pending U.S. patent application Ser. No. 10/699,849 are incorporated herein by reference.

BACKGROUND OF THE INVENTION

1. Field of the Invention

This invention relates to systems, apparatuses, methods, and computer program products relating to establishing and maintaining high quality videoconferences between multiple nodes in which packet loss may be an issue.

2. Discussion of the Background

Video-conferencing is a ubiquitous form of the information exchange in the modern era. A video-conference includes at least two stations exchanging video, audio, and other data to support of a virtual meeting. The video is a stream of data made up of frames that include pictures and sound. Video signals are typically analog but may also be digital. The digital information may or may not be compressed.

As recognized by the present inventors, a limitation with conventional systems is that by employing data compression in the video signal, and subsequently transmitting the compressed data over a communication link, compressed data may be lost or corrupted and cause noticeable losses in video quality. Moreover, a conventional technique begins by digitizing an input video signal to a format where it is represented by a number of frames per second, and a number of pixels per frame. The digitized video signal is then compressed to reduce the required throughput demand on the communication link. The compression method may be based on dividing each frame into blocks of pixels. Each block in a conventional system is compressed in one of the two following ways:

1) As an INTRA block, i.e. the block is compressed independently of pixel values outside the current frame.
2) As an INTER block, i.e. the block is compressed by forming the residual data (difference) between the original pixel values and the corresponding pixel values in a predicted block, and then compressing the residual data. The predicted block is determined from one or more previously coded frames. The spatial displacement of a block between the current frame and a previous frame is described by a motion vector associated with that block. The benefit of using INTER blocks is the small number bits required to represent the reduced dynamic range of the difference signal. Thus, the compressed data for each INTER block contains two types of information: 1) motion vectors and 2) residual data. (This is valid for many video coding standards including H.261, H.263, and H.264.)

To determine the predicted block, motion compensation is used. For each block in the original frame, a motion vector is used to describe the spatial displacement between the original pixel values and the corresponding pixel values in one of the previously coded frames. The predicted block is constructed from the displaced blocks in the previously coded frames. The motion vectors are determined for each block at the transmitter side by a motion estimation procedure, and transmitted to the receiver side as side information.

The compressed data corresponding the each INTRA/INTER block are then collected into transmission packets containing a certain number of bytes. The data from one video frame are normally transmitted as several packets. At the receiver side, the INTRA blocks are decoded directly. The INTER blocks are decoded by first decoding the residual, and then adding the predicted block using the corresponding motion vectors.

All communication links have some risk of generating transmission errors. In the video frame context, using an IP network for example, the transmission errors will manifest themselves as "packet losses," as illustrated in FIG. 1. As shown, a camera 711 produces video frames 701 and applies the video frames 701 to a video encoder 713. The video encoder formats the data in the frames into packets 702, which are then transmitted over a network (such as IP network 715). In the network 715, packets are inadvertently lost or corrupted, such that received packets may contain a lost packet 703. A video decoder 717 is then faced with having to reproduce the video signal despite the fact the one or more of the packets have been lost. Consequently, the output of the video decoder 717 contains some corrupted video frames 704, which appear as imperfect video images when produced on monitor 719. Because conventional methods do not typically employ the packet retransmission techniques, the decoder is faced with having to handle lost packets in a way that minimizes the visual distortion for the end user.

In some situations, there can be two communication links separated by either an MCU or a Gateway as illustrated in FIG. 11 and FIG. 12. The main purpose of a Gateway is to reformat the compressed data between an IP network and a non-IP network, typically an ISDN network. The purpose of an MCU is to allow for several users to participate in the same conference. This implies that an MCU will have several upstream encoders and downstream decoders connected. If the upstream encoder and downstream decoder pair is connected through different networks, the MCU performs reformatting in the same way as the Gateway. However, if the picture resolution needs to be changed between the upstream encoder and the downstream decoder, the MCU also needs to perform transcoding which includes decompression of the incoming data followed scaling of the decompressed video to the new resolution, followed by re-compression of the video with the new resolution. In order to perform transcoding, the MCU will then be equipped with an internal encoder and decoder pair for each upstream/downstream connection.

If the encoder has information about a serious packet loss situation, it could modify its encoding format by adding more redundancy in the transmitted signal so as to avoid video distortion when the video images are reproduced at the destination terminal. As recognized by the present inventors, when there are no packet losses, INTER blocks are much more efficient than INTRA blocks since they normally use fewer bits. INTRA blocks are normally preferred only in case of scene changes and in areas with complex motion where a good approximation cannot be found in the previous frame. However, in the case of a packet loss during transmission, INTER blocks are particularly vulnerable. This is because lost packets in an INTER block affects not only that particular frame, but also creates a propagation of packet errors in subsequently decoded frames. Thus, the error progressively contaminates multiple frames.

Assuming that the lost data cannot be retransmitted, the only way to terminate the propagation of errors is to send an INTRA block, preferably as soon as possible after a packet loss has occurred. As illustrated in FIG. 2, INTRA blocks 807 are interleaved at predetermined intervals between series of INTER blocks 809. If a packet loss 805 occurs in one of the INTER blocks 809, the all subsequently frames 803 are corrupted until the next INTRA block is transmitted. Thus, as recognized by the present inventors, there is a trade-off between compression efficiency using mostly INTER blocks, and robustness to packet loss using mostly INTRA blocks.

On method for intelligently managing the insertion of INTER and INTRA blocks is taught by Thomas Stockhammer and Thomas Wiegand in "H26L Simulation Results for Common Test Conditions for RTP/IP over 3GPP/3GPP2", VCEG-N38, ITU-Telecommunication Standardization Sector, STUDY GROUP 16 Question 6, Video Coding Experts Group (VCEG)", Fourteenth Meeting: Santa Barbara, Calif., USA, 21-24 Sept. 2001, the entire contents of which are incorporated by reference. Among the problems with this method, however, is the computational complexity of the encoder required to compensate for a sustained packet loss situation.

Ideally, the transmitter should get instant feedback from the receiver and be able to react instantly by transmitting the INTRA blocks in the areas being affected by the loss. However, in many cases, the transmitter receives limited, stale and/or inaccurate information about packet losses detected at the receiver side. In particular, the transmitter might receive only delayed information about packet losses without any reference to the particular frame, and to the particular blocks. Typically, the decoder sends a notification to the encoder each time a packet loss occurs. However, in order not to overload the system, a filter may be used to limit the frequency of these notifications to a maximum of M notifications per second.

What is required to address this limitation, as recognized by the present inventors, is an apparatus, system, method, and computer program product that based on the limited, delayed, and inaccurate notifications detects that there is a serious and sustained packet loss situation that the receiver is dealing with. Further, what is required, is an encoder that, if this detection is made, can switch to a "robust mode" characterized by the intelligent insertion of INTRA blocks, instead of INTER blocks, to achieve the best possible trade-off between efficient compression and limited error propagation with minimal system complexity.

In case of a packet loss, the task of the decoder is to conceal the lost data as well as it possibly can. If a packet loss occurs, one or more blocks in that particular frame need to be replaced by some generated blocks that make the visible artifacts of the packet loss as small as possible. One such process is to replace the missing blocks by the corresponding blocks in the previous frame as described in Telenor Research, "Definition of an error concealment model (TCON)", LBC-95-186, ITI-TS SG15 Working Party 15/1, Expert's Group For Very LowBitrate Visual Telephony, Boston (20-23) Jun. 1995, the entire contents of which are incorporated herein by reference. This process is illustrated in FIG. 3, where lines 3001 indicate block data from a previous frame without motion vector information is used to estimate a lost block. Because this approach considers block data without consideration of motion vector information, this approach works reasonably well only when there is a high degree of similarity between consecutive frames (i.e., no motion or almost no motion). However, this approach does not work well when there is a low degree of similarity between consecutive frames (i.e., a large amount of motion.) More advanced conventional systems, therefore, have been developed to take into account motion vector info.

As shown in FIG. 4, concealment based on blocks from the same position in the previous frame can be further enhanced by combining the motion vector from the lost block with video (e.g., pixel) data from the previous block. This is possible in situations where the block data is lost but the motion vector data is not lost. Thus, concealment of a lost block in block position (k,l) in frame n is performed using the lost block's own motion vector, $V_n(k,l)$.

However, typically a motion vector associated with a block is lost with the rest of the data for that block. Thus, the challenge is to find a good estimate $V'_n(k,l)$ of the lost motion vector for the lost block, particularly when there is a low degree of similarity between consecutive frames. One method for estimating the motion vectors of lost blocks is taught by Stephan Wenger and Michael Horowitz in "Scattered Slices: A New Error Resilience Tool for H.26L", JVT-B027, Joint Video Team (JVT) of ISO/IEC MPEG and ITU-T VCEG (ISO/IEC JTC1/SC29/WG11 and ITU-T SG16 Q.6) 2nd Meeting, Geneva, CH, Jan. 29-Feb. 1, 2002, the entire contents of which are incorporated by reference. In this method, the motion vector of the lost block is estimated from motion vectors of neighbor blocks within the same frame as the lost block with the following equation:

$$V'_n(k,l)=f(V_n(k-1,l-1),V_n(k-1,l),V_n(k-1,l+1),V_n(k,l-1),V_n(k,l+1),V_n(k+1,l-1),V_n(k+1,l),V_n(k+1,l+1))$$

where $V_n(i,j)$ is the motion vector for block position (i,j) in frame n, and $f(\ )$ is some function. This situation is illustrated in FIG. 5. However, a problem with this method is that the method assumes that neighbor blocks are not lost, which is not always true.

What is required, as discovered by the inventors, is an improved method of estimating the contents of a lost block by finding an estimate of the motion vector for the lost block that does not rely upon the availability of neighbor block motion vector information.

SUMMARY OF THE INVENTION

One object of the present invention is to provide an apparatus, system, method, and computer program product that conceals lost data at the decoder side of a system that uses data compression over lines that are vulnerable to data corruption. This is achieved by providing an accurate estimate of motion vectors of blocks of video lost due to packet loss without relying on neighbor block information, particularly when there is a low degree of similarity between consecutive frames.

On the encoder side, the present invention also detects that there is some serious and sustained packet loss situation that the receiver is dealing with. This detection is based on the limited, delayed, and inaccurate notifications about packet losses provided by the receiver. If this detection is made, the encoder switches to a "robust mode" characterized by the intelligent insertion of INTRA blocks, instead of INTER blocks, to achieve an improved trade-off between efficient compression and limited error propagation. The Robust mode of the present invention contains a higher number of INTRA blocks which spaced apart from each other based on an occurrence rate of detected packet losses. The higher the packet loss occurrence rate, the closer the spacing of INTRA blocks. By spacing the INTRA blocks apart from one another in this fashion, the video disturbances caused by packet losses are limited to just a few frames without unnecessarily dropping throughput rate or degrading video quality.

BRIEF DESCRIPTION OF THE DRAWINGS

A more complete appreciation of the present invention and many of the attendant advantages thereof will be readily obtained as the same becomes better understood by reference to the following detailed descriptions and accompanying drawings:

FIG. 7 is a frame map showing a distribution of INTRA and INTER blocks in normal mode processing and robust mode processing according to the present invention;

DETAILED DESCRIPTION OF THE PREFERRED EMBODIMENTS

Figure 1:
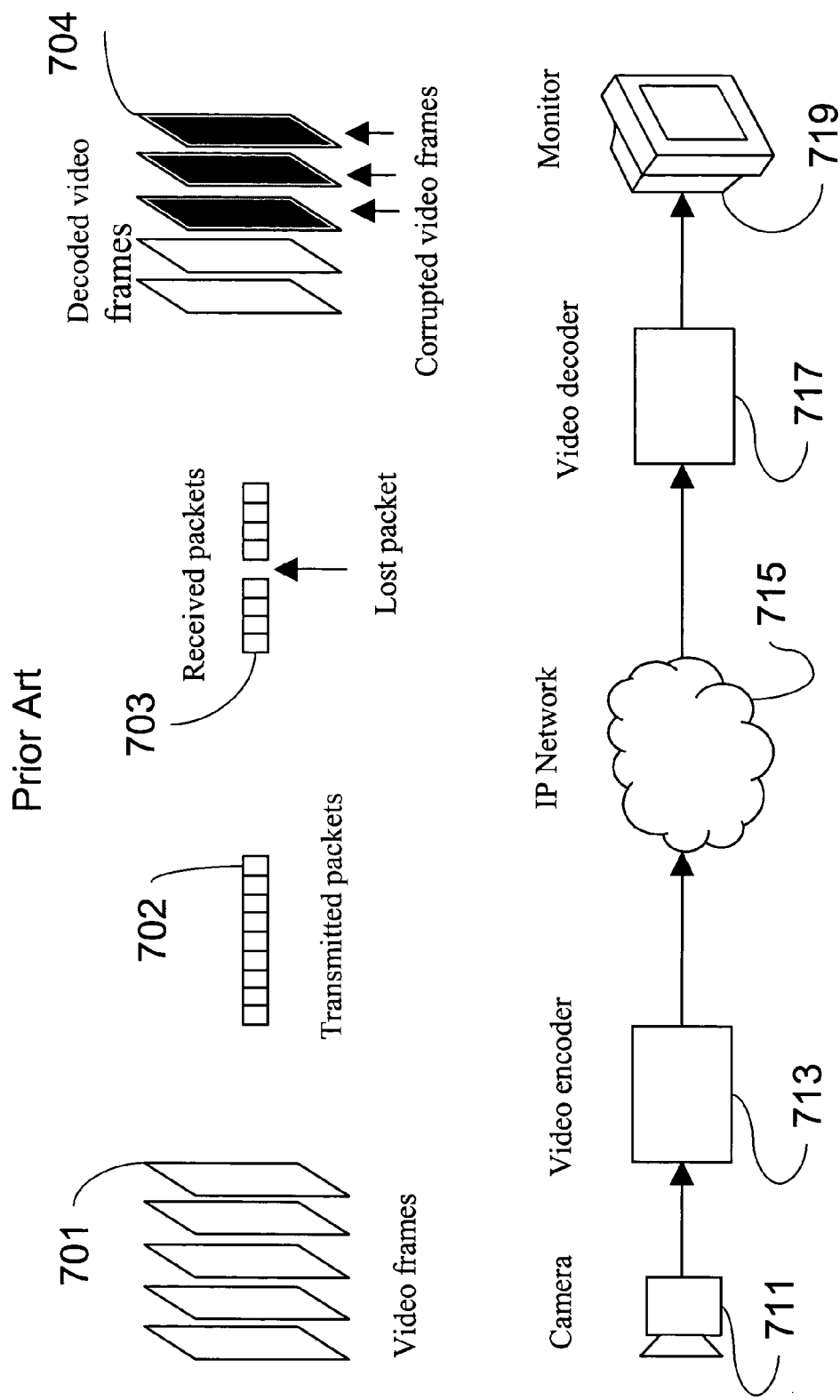
FIG. 1 is a signal flow diagram, illustrating the effect of packet loss on corrupted video frames output by a decoder.
Figure 2:
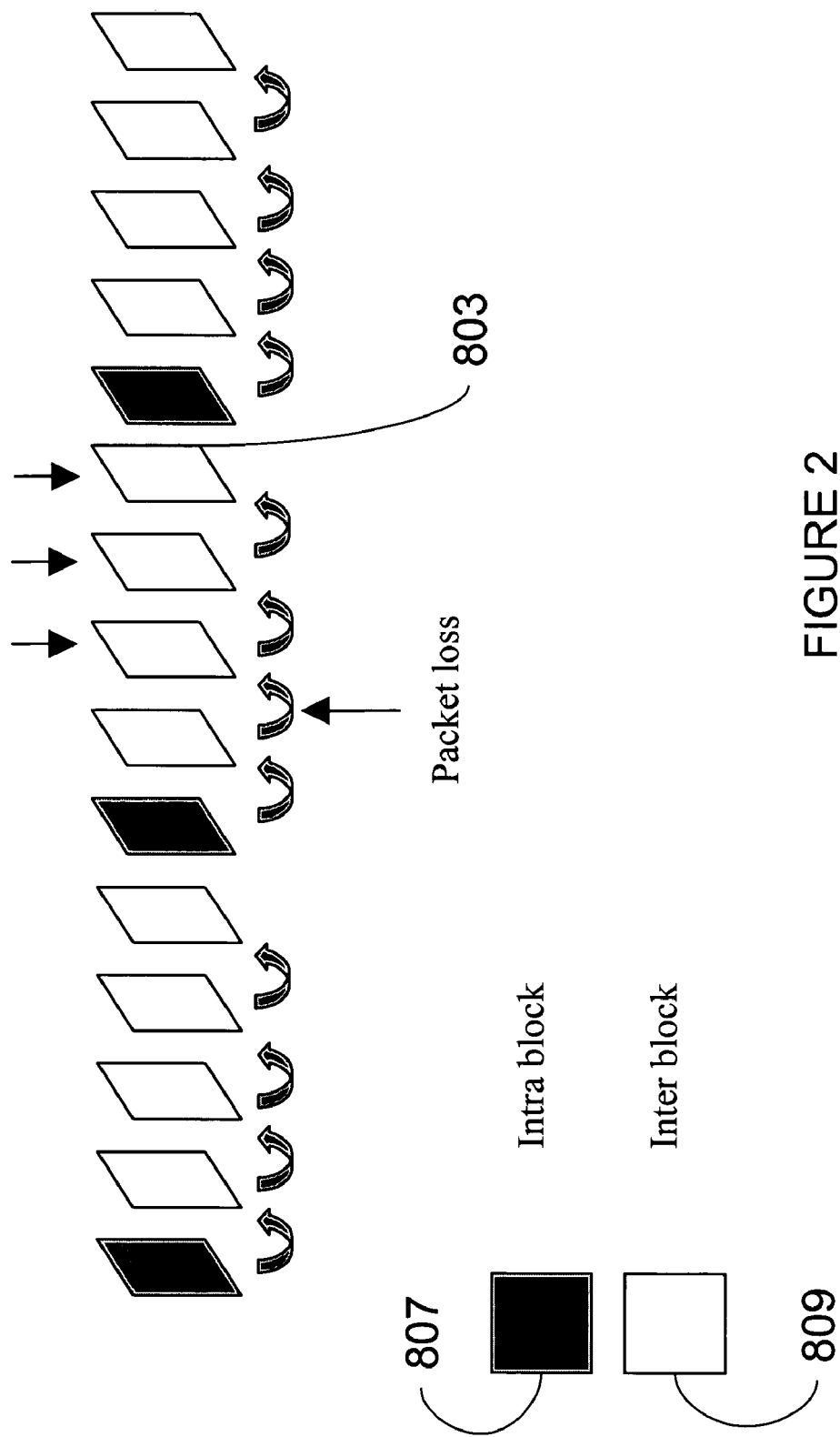
FIG. 2 is an illustration of the progressive corruption of a packet error on sequential INTER frames.
Figure 3:
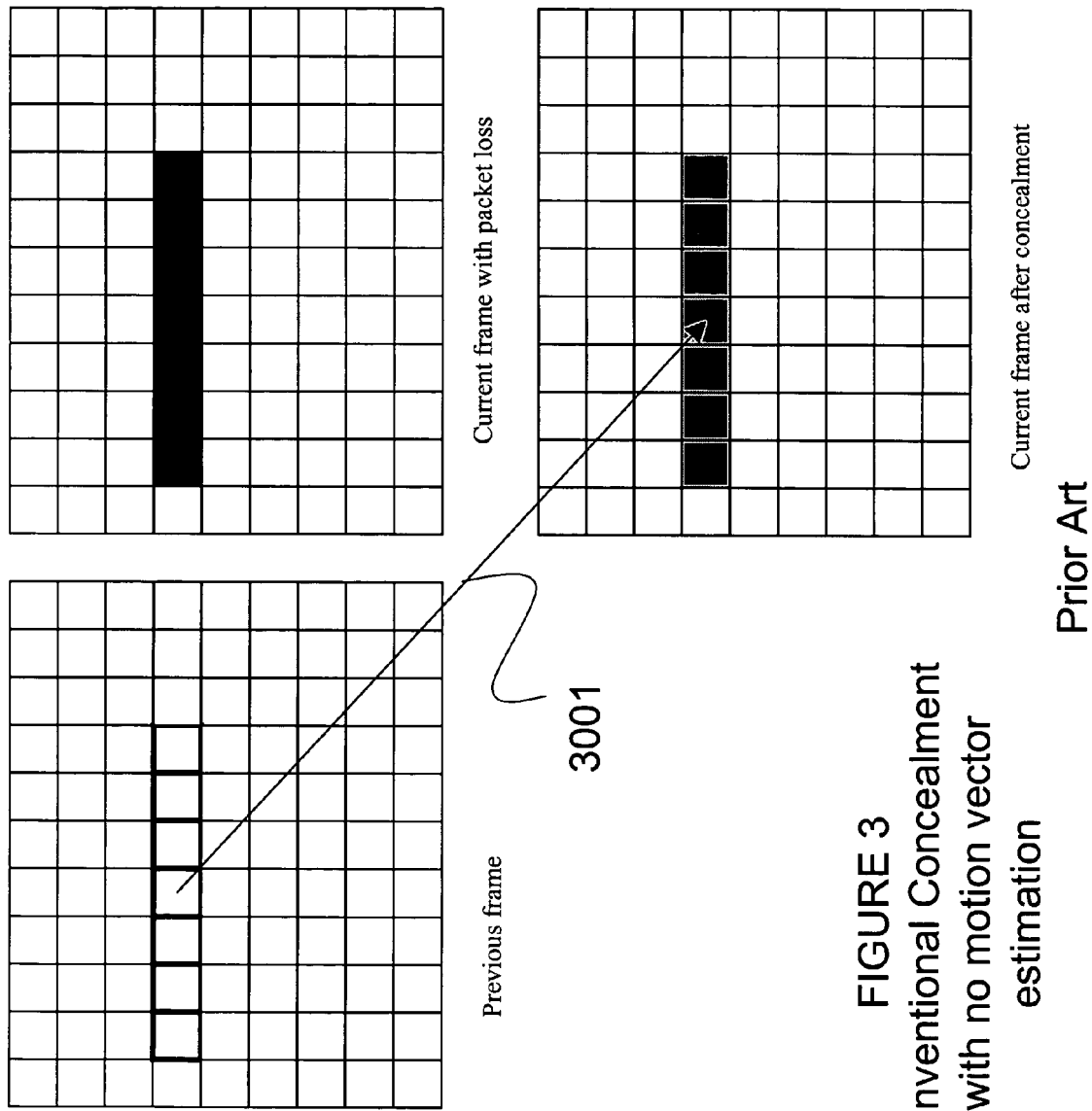
FIG. 3 is a frame map showing a conventional block concealment process that includes no motion vector information.
Figure 4:
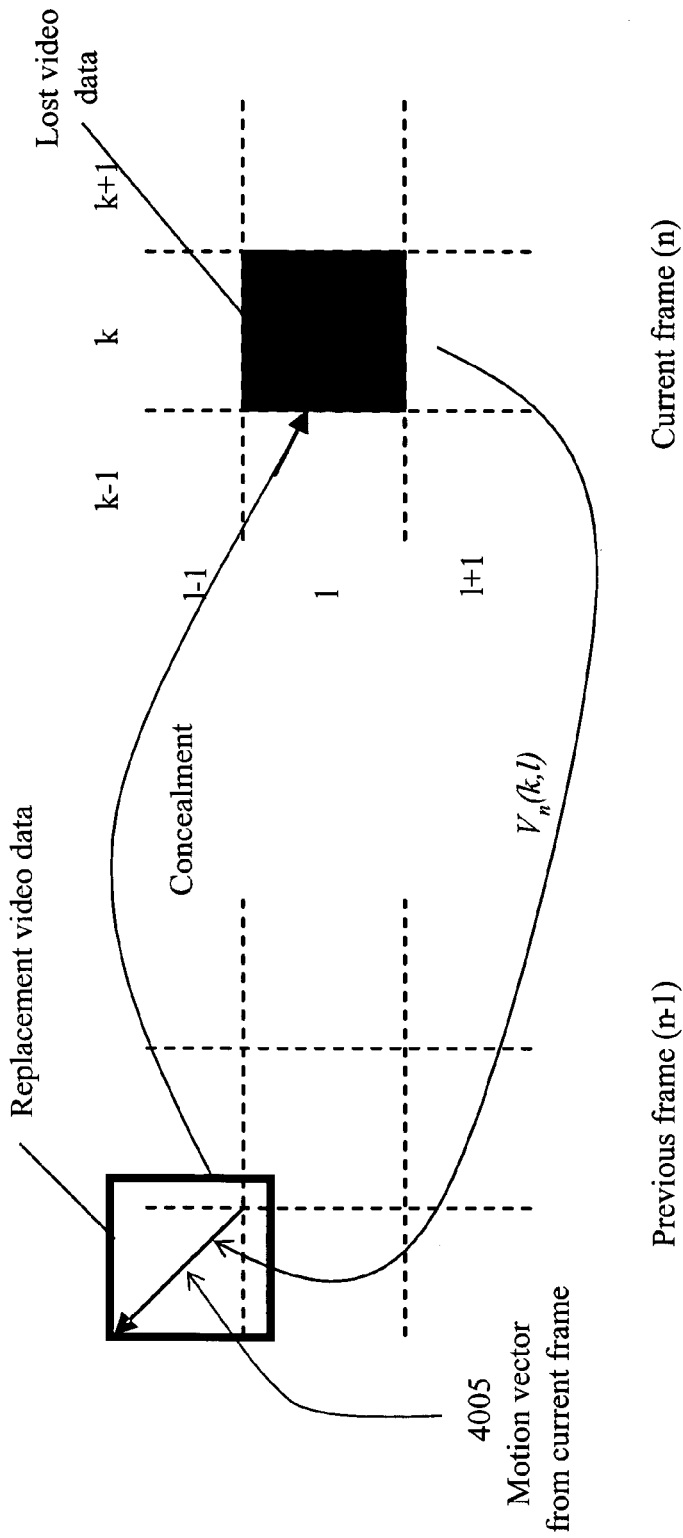
FIG. 4 is a frame map showing a conventional block concealment process that combines motion vector information from a lost block with video data the corresponding block in a previous frame.
Figure 5:
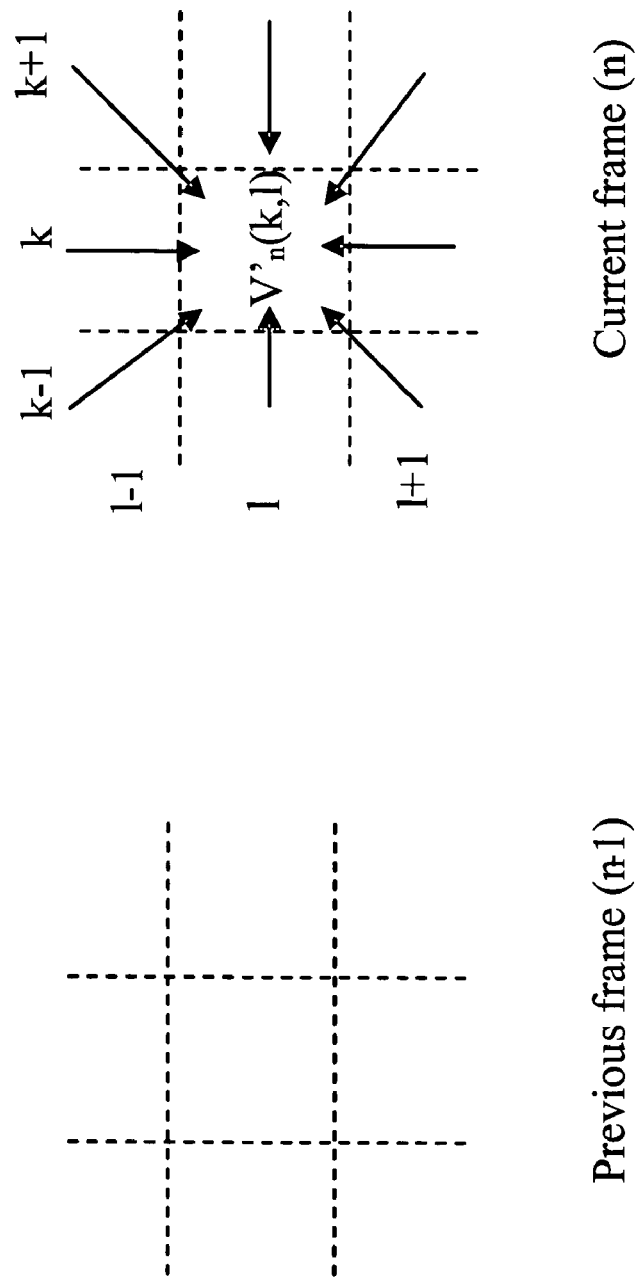
FIG. 5 is a frame map showing a conventional block concealment process that uses motion vector data from a neighbor block in a current frame.

The following comments relate to the drawings, wherein like reference numerals designate identical or corresponding parts throughout the several views.

Figure 6:
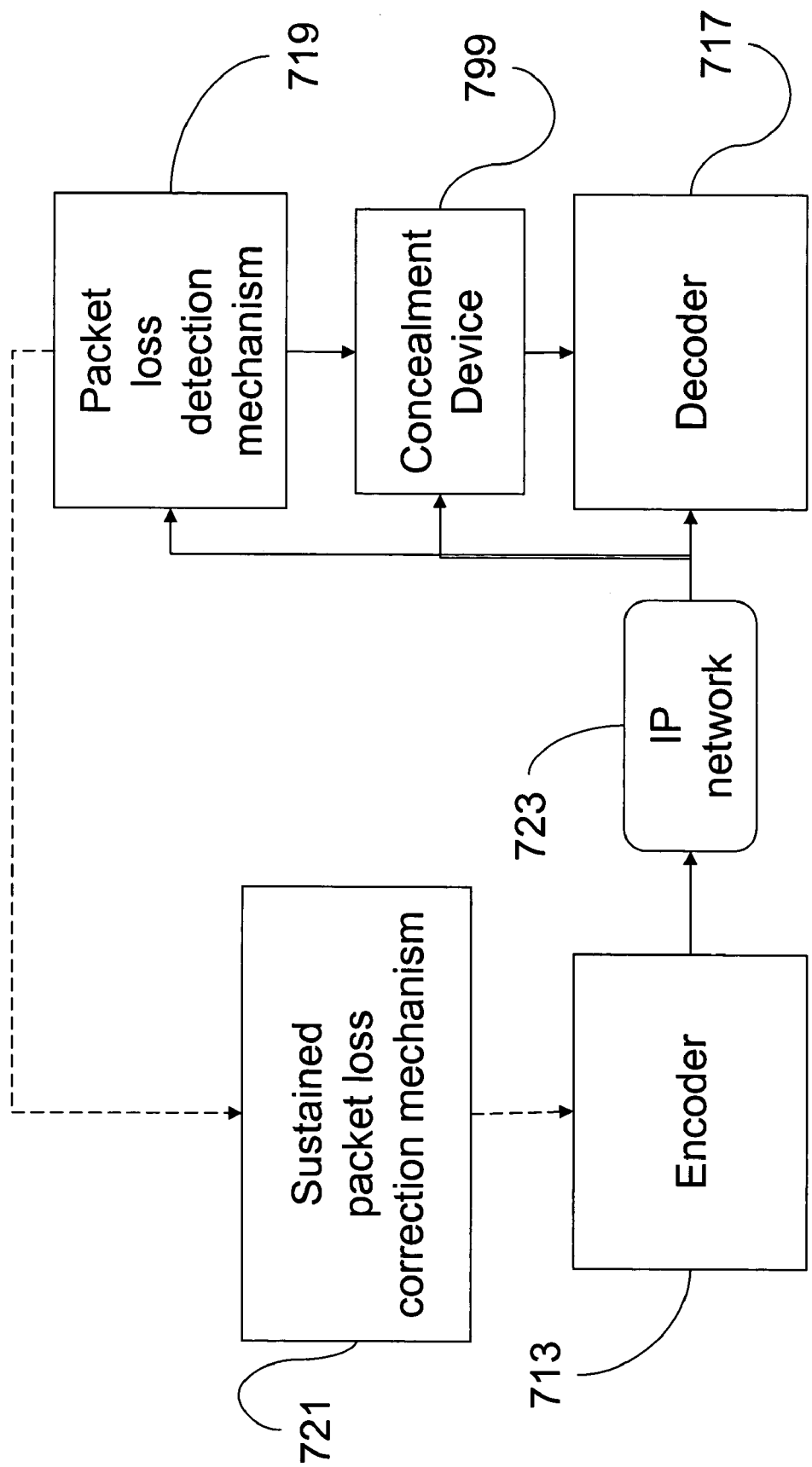
FIG. 6 is a block diagram of a system that implements packet loss detection, concealment, and management according to the present invention.

FIG. 6 shows the various components of the present invention. The encoder 713, the IP network, 723, and the decoder 717 are present in both conventional systems and systems that apply to the present invention. The sustained packet loss notification device 721 and the concealment device 799 operate independently of each other, while the packet loss detection device 719 is needed for both the sustained packet loss notification device 721 and the concealment device 799. This gives the following three possibilities for implementation.

a) All components as illustrated in FIG. 6.
b) All components as illustrated in FIG. 6, except the Sustained packet loss detection device.
c) All components as illustrated in FIG. 6, except the Concealment device.

FIG. 6 is a block diagram of a system according to the present invention that employs a packet loss detection mechanism 719 to inform an encoder 713 of a packet loss situation. The system includes an encoder 713 that sends video data over a communications network (wired, wireless or hybrid) to a decoder 717. Occasionally, the network (shown as an IP network 723) drops or corrupts some packets. Accordingly, a packet loss detection mechanism 719 monitors the video data for dropped or lost packets.

The packet loss detection mechanism 719 provides notification messages (at a periodic, scheduled, or per-lost-packet basis) to a sustained packet loss detection mechanism 721 through either a dedicated communication link, or a return link over the network. These notifications typically do not need to identify exactly which packet was lost, however specific packet identification is possible in alternative embodiments. The packet loss notifications are sent every time a packet loss occur, but usually not more frequent than M times per second. Typically, M is in the range of 1 to 10. The sustained packet loss detection mechanism 721 determines if a sustained packet loss situation exists, and notifies the encoder 713 to switch modes if needed.

The sustained packet loss detection mechanism 721 detects a sustained packet loss situation if there is sufficient periodicity in the last n packet loss notifications. According to the invention, sufficient periodicity is determined as follows:

Let $T_0, T_1, \ldots$ and $T_N$ be the time instances for the N most recent notifications.

Define the time differences as $d_0 = T_1 - T_0$, $d_1 = T_2 - T_1$, $\ldots$ $d_{N-1} = T_N - T_{N-1}$.

Calculate the N×N ratios, $r_{i,j} = |d_i|/|d_j|$ made up of every possible combination of two time differences.

If at least K of the N×N ratios are less than a predetermined threshold t, sufficient periodicity is detected.

Typical values for N, K, and t are 8, 32, and 0.9 respectively although other values may be used as well. For example, N may range between 2 and 20 (typically, but not exclusively), K may range between 1 through 400 (typically, although not exclusively) and t may range between 0.5 through 0.99 (typically, but not exclusively). Moreover, it is not problematic to operate in a robust mode if there is sufficient throughput capacity to handle the greater amount of data associated with INTRA blocks (assuming a lesser coding efficiency can be achieved for an INTRA block than for an INTRA block).

Whenever a sustained packet loss situation is detected, the encoder 713 switches to the robust mode under the direction of the sustained packet loss detection mechanism 721, which may be incorporated into the encoder 713. In an alternative embodiment not shown, the sustained packet loss detection mechanism 721 may be incorporated into the decoder 717 rather than in the encoder 713.

The robust mode, as illustrated in FIG. 7, is characterized by the insertion, by an encoder, of INTRA blocks instead of INTER blocks intelligently to achieve the best possible trade-off between efficient compression and limited error propagation. As seen from FIG. 7, the Robust mode contains a higher number of INTRA blocks, spaced apart from each other based on an occurrence rate of detected packet losses. The higher the packet loss occurrence rate, the closer the spacing of INTRA blocks. By spacing the INTRA blocks apart from one another in this fashion, the video disturbances caused by packet losses are limited to just a few frames without unnecessarily dropping throughput rate or degrading video quality.

According to the invention, robust mode contains two mechanisms, smart update and optimal mode selection. "Smart update" acts on packet loss notification by updating the entire picture using INTRA blocks during a predetermined number of frames (e.g., 2 through 15). While a straightforward method sends the entire frame as INTRA immediately after a packet loss notification, smart update uses several frames to update the picture. The benefit of this is to distribute the large number of bits used for INTRA compared with INTER over several frames resulting in a more evenly distributed number of transmitted bits. During the smart update period, motion vectors are not allowed to point into areas of the picture that has not yet been updated by an INTRA block.

"Optimal Mode Selection" is based on taking anticipated packet losses into account when making a decision between INTRA and INTER blocks. In situations without packet loss, this mode selection is normally done by analyzing the degree of similarity (such as by a statistical method like those discussed below, or a cross-correlation function to identify a "distance") between the current frame and the previous frame for that particular block. If there is a high degree of similarity, INTER mode is chosen. For low degree of similarity (typically caused by scene changes or complex motion), INTRA mode is chosen. Without packet losses this is simply a compression efficiency issue. Various statistical methods may be employed for making the likeness test such as least squares fit, Chi-squared or other applied statistical methods, such as those described in Miller, R., "Beyond ANOVA, Basics of Applied Statistics," John Wiley & Sons, 1986, the entire contents of which being incorporated herein by reference.

When a sustained packet loss situation is detected, additional criteria for mode selection are used. These criteria include reliability of the reference block, and change in mean value. The reliability of a block is used to modify the INTRA/INTER decision rule so that low probability favors an INTRA decision. The change in mean value from one block to another is used to modify the INTRA/INTER decision rule so that a large change in mean value favors INTRA decision. The decision criteria are described in more detail below.

In particular, the INTRA/INTER mode decision without sustained packet loss is made as follows:

1) Calculate the sum of absolute differences (SAD) between the original block pixels, c(i,j) and the pixels pointed to by the chosen motion vector, p(i,j) as follows:

$$SAD_1 = \sum_{i,j} |c(i, j) - p(i, j)|$$

2) Calculate the SAD between the original blocks of pixels and its mean value as follows:

$$SAD_2 = \sum_{i,j} |c(i, j) - M| + K$$

where M is the mean value of the block, and where K is an empirically determined constant. A typical value for K is 500, but may be in an inclusive range of 10 through 1000, for example.

3) Make the mode selection as follows:
   Choose INTRA mode if $SAD_2 < SAD_1$
   Choose INTER mode if $SAD_2 > SAD_1$ However, in the sustained packet loss scenario, the reliability of the reference blocks depends on the period since it was last updated as INTRA. In particular, the reliability, $R_n$ of a reference block in frame no. n is determined as follows.

| | |
|---|---|
| For INTRA blocks: | $R_n = 1 - p$ |
| For INTER blocks with non-zero difference signal: | $R_n = (1 - p)R_{n-1}$ |
| For INTER blocks with zero difference signals: | $R_n = R_{n-1}$ |

Here, p is the packet loss probability and $R_{n-1}$ is the reliability of the same block in the previous frame. In another implementation, $R_{n-1}$ can be replaced with an expression dependent on the reliability of neighbor blocks to take the effects of non-zero motion vectors into account.

The change in mean value, $MD_n$ for a block in frame no. n is calculated as follows:

$$MD_n = |M_n - M_{n-1}|$$

where $M_n$ and $M_{n-1}$ are the mean values of the block in frame no. n and n−1 respectively.

Thus, in the case of sustained packet loss, the INTRA/INTER decision rule is modified by changing the value of $SAD_1$ as follows:

$$SAD_1 = \left[\sum_{i,j} |c(i, j) - p(i, j)|\right][(ar + b)(c(1 - R_n) + dpMD_n) + 1],$$

where r is the bit rate of the compressed video stream measured in kbps, p is the packet loss probability, and a, b, c, and d are empirically determined constants, depending on the communication system. Typical values for a, b, c and d, are 0.02, −6, 0.5, and (0.0001 through 0.001) respectively. However, "a" may typically fall in an inclusive range of 0.0 through 0.2; "b" may typically fall in an inclusive range of −100.0 through 100.0; "c" may typically fall in an inclusive range of 0.0 through 100.0; and "d" may typically fall in an inclusive range of 0.0001 through 0.01. The second term is a penalty term favoring the INTRA mode. The constants are chosen such that the penalty term increases with the change in mean value $MD_n$, the packet loss rate p, and the bit rate r, and decreases with the reliability $R_n$. $SAD_2$ is calculated in the manner previously described.

Figure 8:
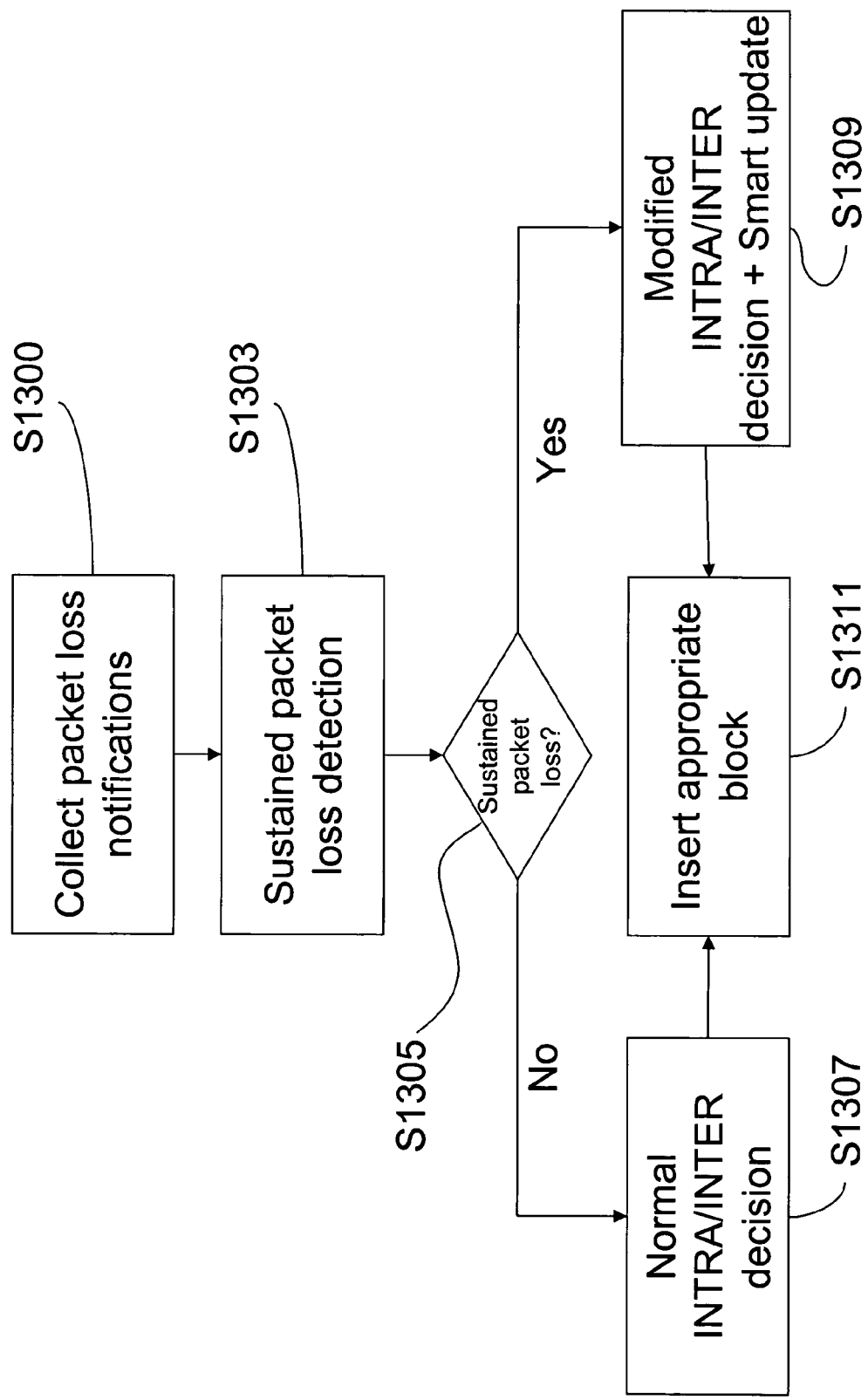
FIG. 8 is a flowchart of a process for deciding whether normal mode or robust mode encoding should be performed according to the present invention.

FIG. 8 is a flowchart for detecting packet loss and switching to the robust mode in the encoder. The process begins in step S1300, where the packets losses are detected and collected, and notifications of the packet losses are sent to the sustained packet loss detection mechanism 721 (FIG. 6). Subsequently, the process proceeds to step S1303, where packet loss notifications are collected and analyzed for detecting a "sustained" packet loss situation. The process then proceeds to step S1305 where an inquiry is made about whether a sustained packet loss situation exists. If the response to the inquiry is negative, the process proceeds to step S1307, where the normal INTER/INTRA decision process is applied to select INTER or INTRA blocks, which are then inserted in the frame map in step S1311. However, if the response to the inquiry in step S1305 is affirmative, the process proceeds to step S1309 where the modified INTER/INTRA decision process is invoked and a robust mode of operation is selected so as to offset the adverse affects of sustained packet losses.

Also as shown in FIG. 6, the present invention may include a concealment device 799. In this case, the packet loss detection device 719 sends information to the concealment device about the identify of which packets were received and which packets were lost. As opposed the the notifications sent to the sustained packet loss detection device, the notifications sent to the concealment device typically identifies exactly which packets were lost. According to the present invention, the contents of lost blocks of video data may be estimated from previous and/or neighbor blocks of video data where the relationship between estimated motion vector and the motion vector of the corresponding block from the previous frame is represented mathematically as follows:

$$V'_n(k,l) = V_{n-1}(k,l).$$

Figure 10:
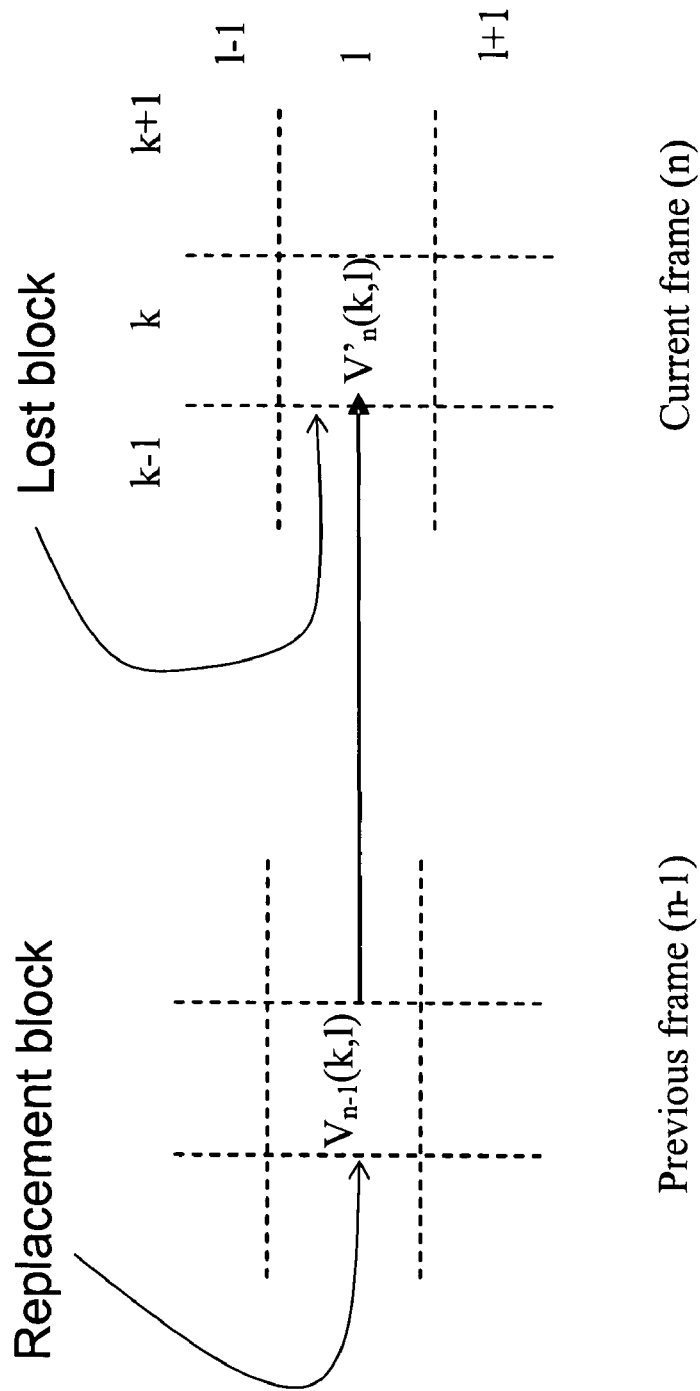
FIG. 10 is a frame map showing an embodiment of the invention's block concealment process that estimates a lost video data from both block and motion vector information from a previous frame.

That is, $V'_n(k,l)$ is the estimated motion vector for frame n in block position (k,l) and $V_{n-1}(k,l)$ is the actual motion vector of frame n−1 at block position (k,l). This is shown in FIG. 10.

Thus, in the present invention, the previous frame block motion vectors are used to generate a coarse estimate of the current frame from the previously decoded frame. In addition, an estimate of the corresponding residuals is used to refine this estimate. In the present invention, the estimated residual is chosen as a predetermined value (either zero or another value).

Figure 9:
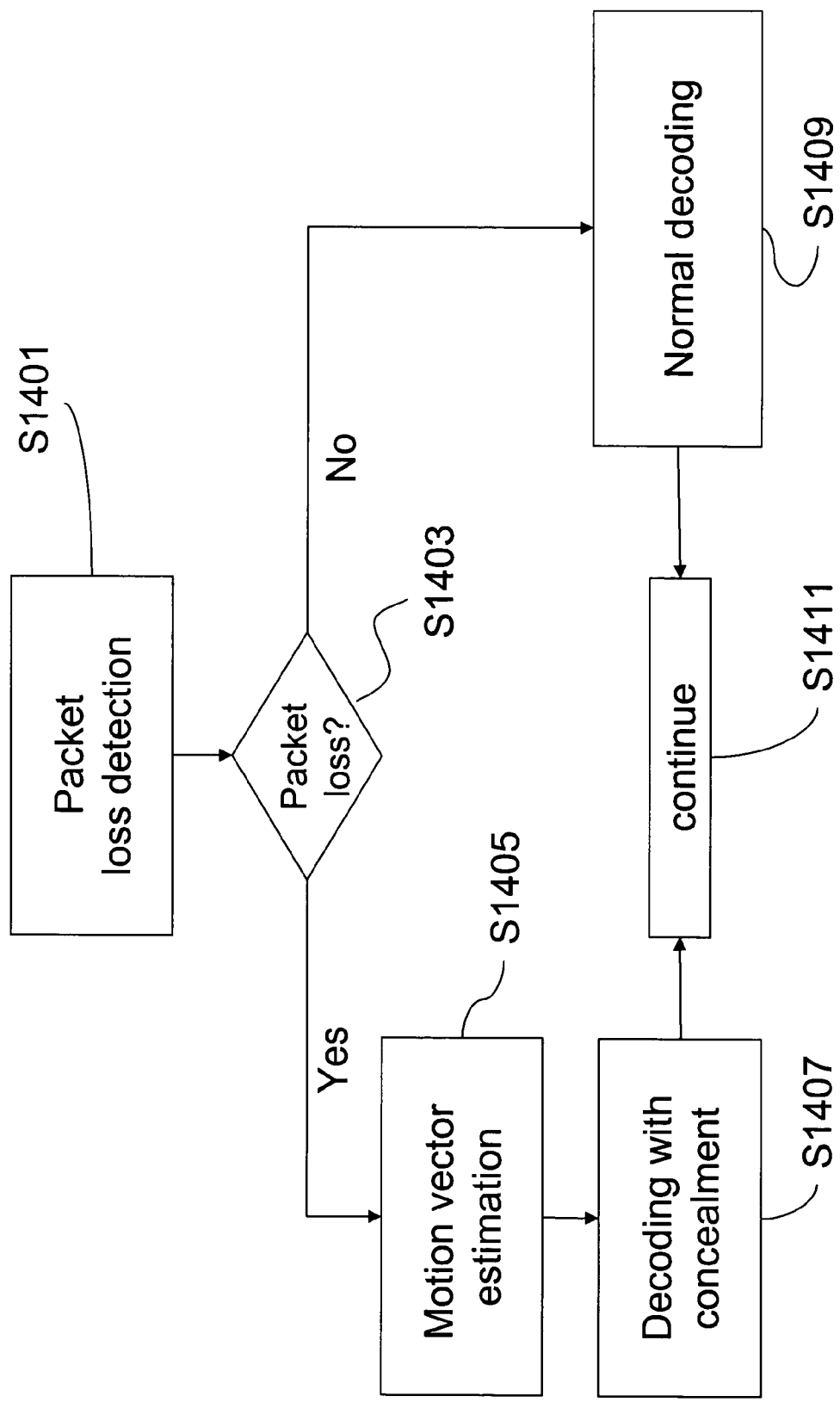
FIG. 9 is a flowchart of a process showing how decoding with motion vector estimation may be employed according to the present invention.

FIG. 9 is a flowchart of a process flow according to the present invention where the decoder determines whether to operate with concealment, or not. The process begins in step S1401 where there is packet loss detection. The process then proceeds to step S1403, where an inquiry is made regarding whether packet losses were in fact detected. If so, the process proceeds to step S1405, where the motion estimation mechanism extracts motion vectors from one or more past frames, and/or adjacent blocks and provides them to the decoder in step S1407, where the decoder conceals the corrupted blocks. However, if the response to the inquiry in step S1403 is negative, the process proceeds to step S1409, where normal decoding is performed, and then the process continues in step S1411.

Figure 11:
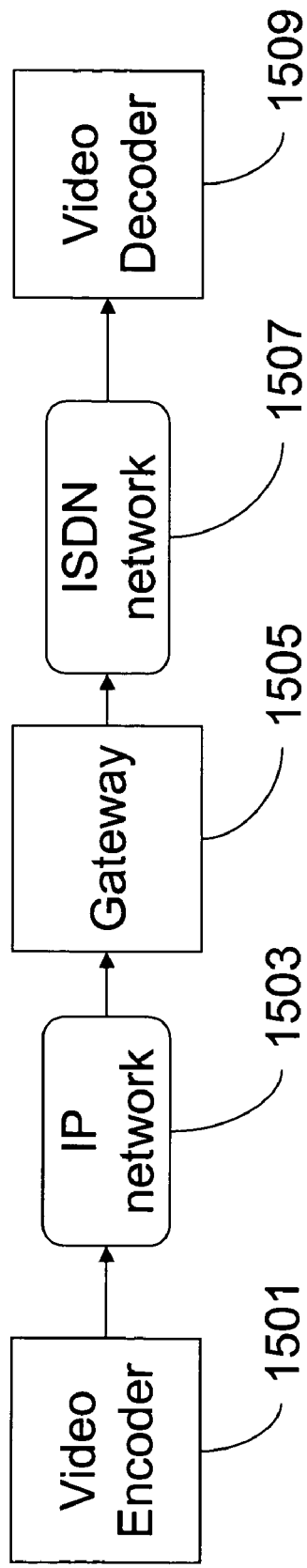
FIG. 11 is a block diagram of a conventional IP-to-ISDN network connected by a conventional gateway device.
Figure 12:
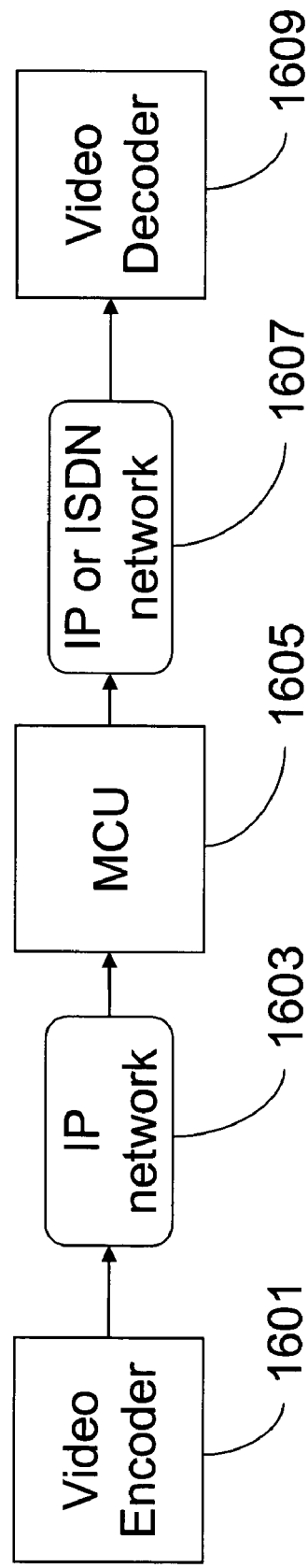
FIG. 12 is a block diagram of a IP-to-ISDN network connected by a conventional MCU.

In other embodiments of the present invention, the previously described techniques for handling packet loss can be extended and/or adapted to the case where a gateway or an MCU is used in the packet loss scenario of FIG. 1. In one of these embodiments, the gateway 1505 is situated between an IP network 1503, which is fed data by an encoder 1501, and an ISDN network 1507, which feeds data to a decoder 1509 as illustrated in FIG. 11. In another of these embodiments, an MCU 1605 can be situated between an IP network 1603, which is fed data by an encoder 1601 and another network 1607 (e.g., an ISDN network or a second IP network), which feeds data to a decoder 1609, as illustrated in FIG. 12. It should be clear to one skilled in the art that the another network 1607 may also be an ATM network, an MPLS network, or any other continuous stream network.

In the IP network 1503, the compressed video data from the encoder is divided into IP packets, each packet containing a certain number of bytes. Since each packet contains a header with a unique identifier, lost packets can easily be detected at the receiving end.

When the another network 1607 is an ISDN network, the compressed video data is a continuous stream of bytes. Since there is no packet header in an ISDN network, detection of lost data is more difficult. On the other hand, loss of data occurs extremely rare in an ISDN network.

One function of the gateway 1505 is to reformat compressed data from a packetized byte stream to a continuous byte stream. One problem with conventional systems which are subject to noise or other signal loss, packet losses in the IP network will propagate to the ISDN network as a missing sub-sequence of the continuous byte stream. Since the downstream decoder 1509 has no knowledge about the initial packet loss, and since errors in a continuous byte stream are hard to detect, the system of FIG. 6 will fail since:

1) The encoder 1501 is not notified about the packet loss and fails to take appropriate action.
2) The decoder 1509 does not initiate concealment.

Figure 13:
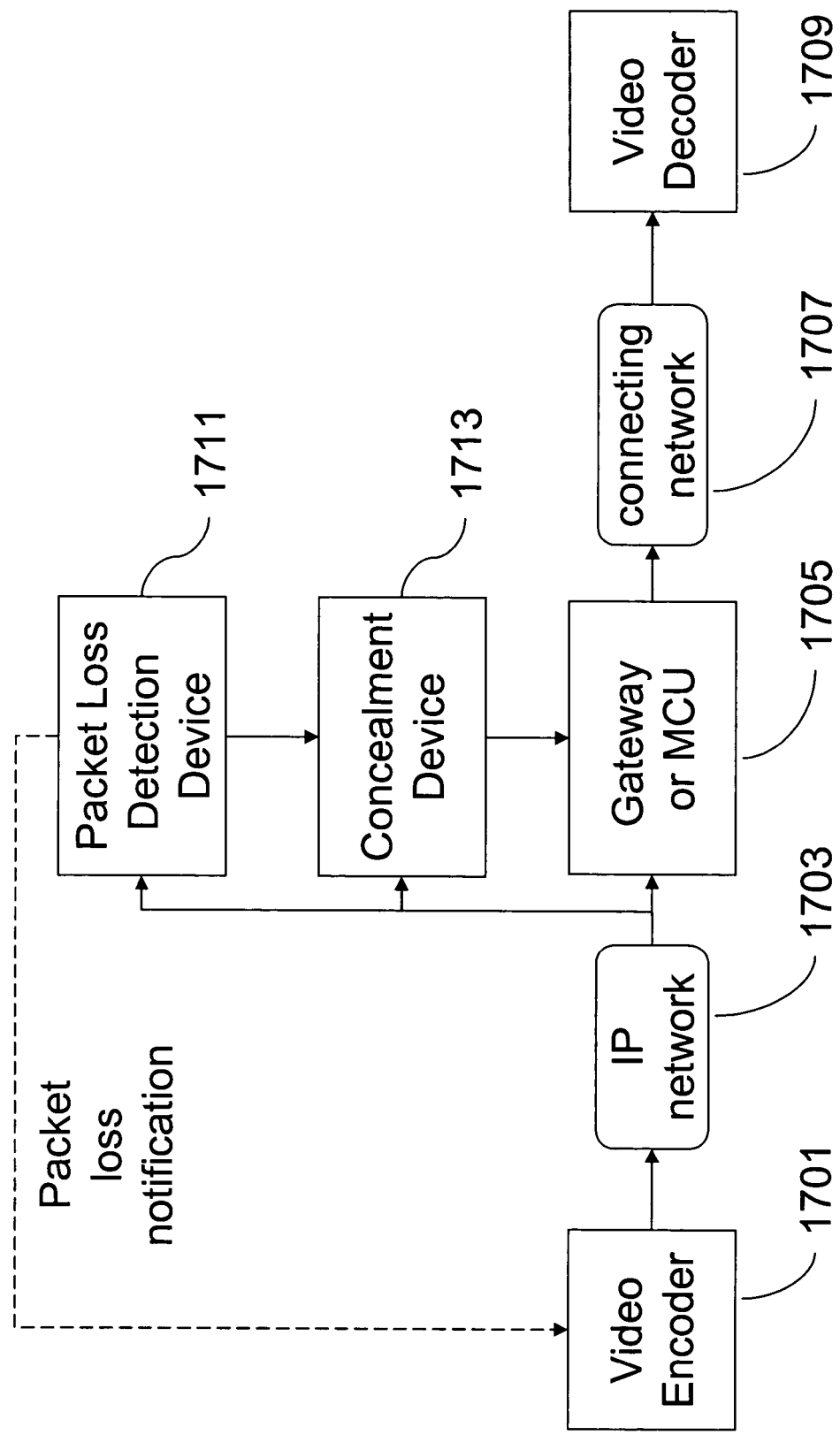
FIG. 13 is a block diagram of a modified gateway or MCU according to an embodiment of the present invention.

One embodiment of the present invention solves this problem by adapting the previously described packet loss detection and concealment methods as shown in FIG. 13. Here, video encoder 1701 transmits compressed video data packets via IP network 1703 to a gateway or MCU 1705. Gateway or MCU 1705 relays the packets to video decoder 1709 if the connecting network 1707 is an IP network. Gateway or MCU 1705 reformats the packets to a compatible format before relaying the data to video decoder 1709 if the connecting network 1707 is not an IP network (e.g., an ISDN network).

In either case, in one embodiment, gateway or MCU 1705 includes a concealment device 1713 and a packet loss detection device 1711 while video encoder 1701 also includes a sustained packet loss detection mechanism (not shown). In a second embodiment (not shown), gateway or MCU 1705 includes a packet loss detection device 1711 but does not include a concealment device 1713 while video encoder 1701 does include a sustained packet loss detection mechanism. In a third embodiment (not shown), gateway or MCU 1705 includes a concealment device 1713 and a packet loss detection device 1711 while video encoder 1701 does not include a sustained packet loss detection mechanism.

In the embodiment of FIG. 13, encoder 1701 relays video data to IP network 1703. Gateway or MCU 1705 further relays the video data to video decoder 1709 via ISDN network 1707. The gateway or MCU 1705 includes, or is co-located with, a packet loss detection device 1711 and a concealment device 1713.

In this embodiment, packet loss detection by packet loss detection device 1711 can be done in the same way as previously described relative to FIG. 6, to include informing encoder 1701 of the presence of lost packets. Also, the upstream sustained packet loss detection device (not shown) performs in the same way as previously described.

Also, for an MCU 1705 transcoding by compression and decompression, concealment device 1713 estimates the lost video blocks, inserts the estimated data within the uncorrupted data, before the MCU compresses the resulting video data into the downstream network format (e.g., ISDN) without degrading video-conference performance. In this scenario, the previously described method of estimating a missing video frame based on previous frame motion vectors and residuals is directly applicable.

However, for a gateway or an MCU 1705 relaying packets without doing transcoding, concealment device 1713 must first decompress the incoming packets, estimate the lost video frames, compress the estimated data, and insert the compressed estimated data into the compressed stream or packets without causing undue delay. This embodiment operates differently than was previously described. In this scenario, the previously described method of estimating a missing video frame based on previous frame motion vectors and residuals is augmented with an additional step of re-compressing the estimated video data and inserting the re-compressed video data into the downstream packet stream.

Figure 14:
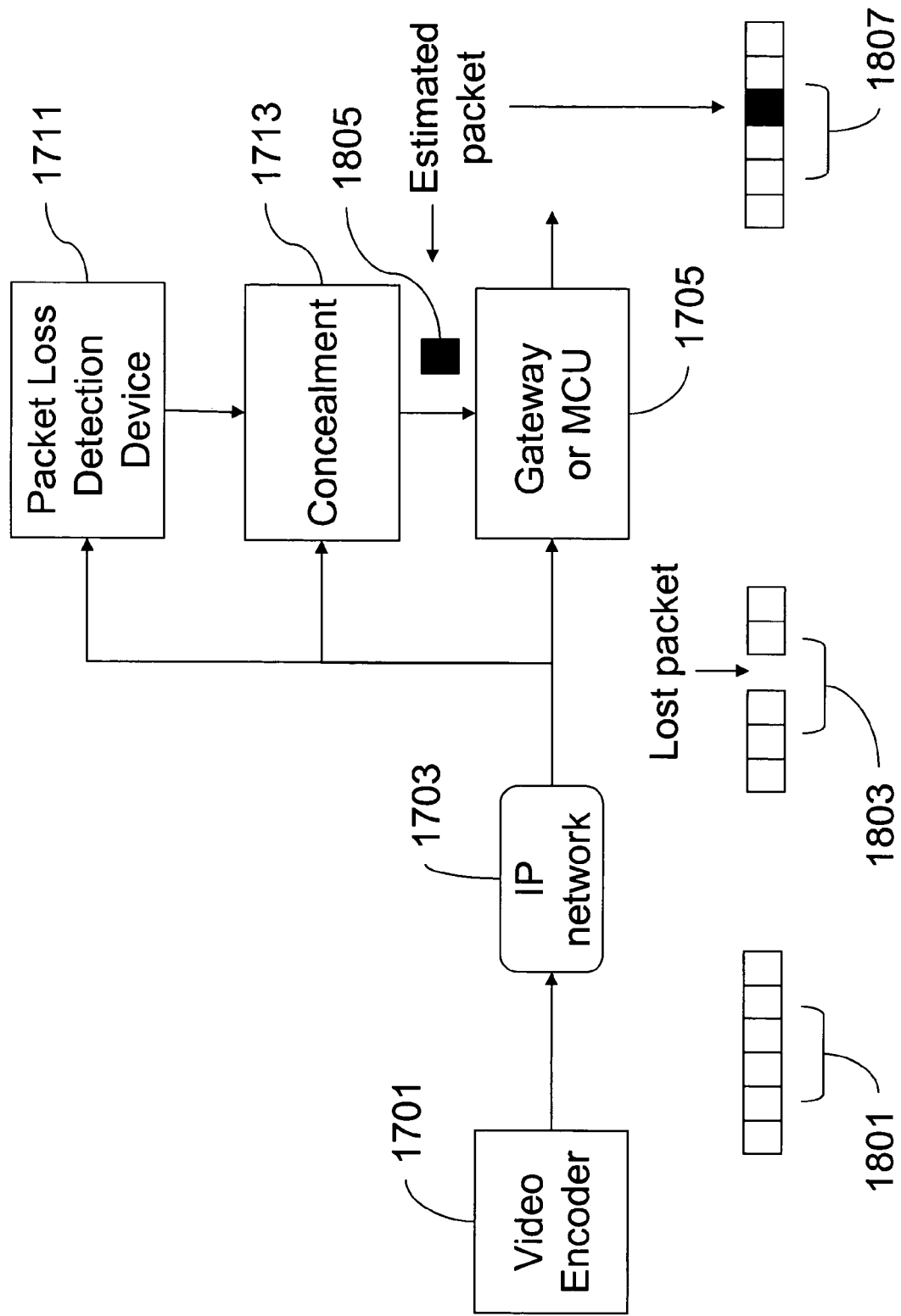
FIG. 14 is a block diagram of a concealment device installed with or integral to the modified gateway or MCU of FIG. 12.

Therefore, as shown in FIG. 14, for a gateway or an MCU 1705 relaying packets without doing transcoding, a sequence of packets 1801 is sent by encoder 1701. Sequence 1801 becomes corrupted in IP network 1703 resulting in a sequence 1803 with a missing packet. Concealment device 1713, which includes a decoder and encoder, replaces the lost packet with an estimated packet 1805 so that gateway or MCU 1705 sends a sequence 1807 that includes estimated packet 1805.

Figure 15:
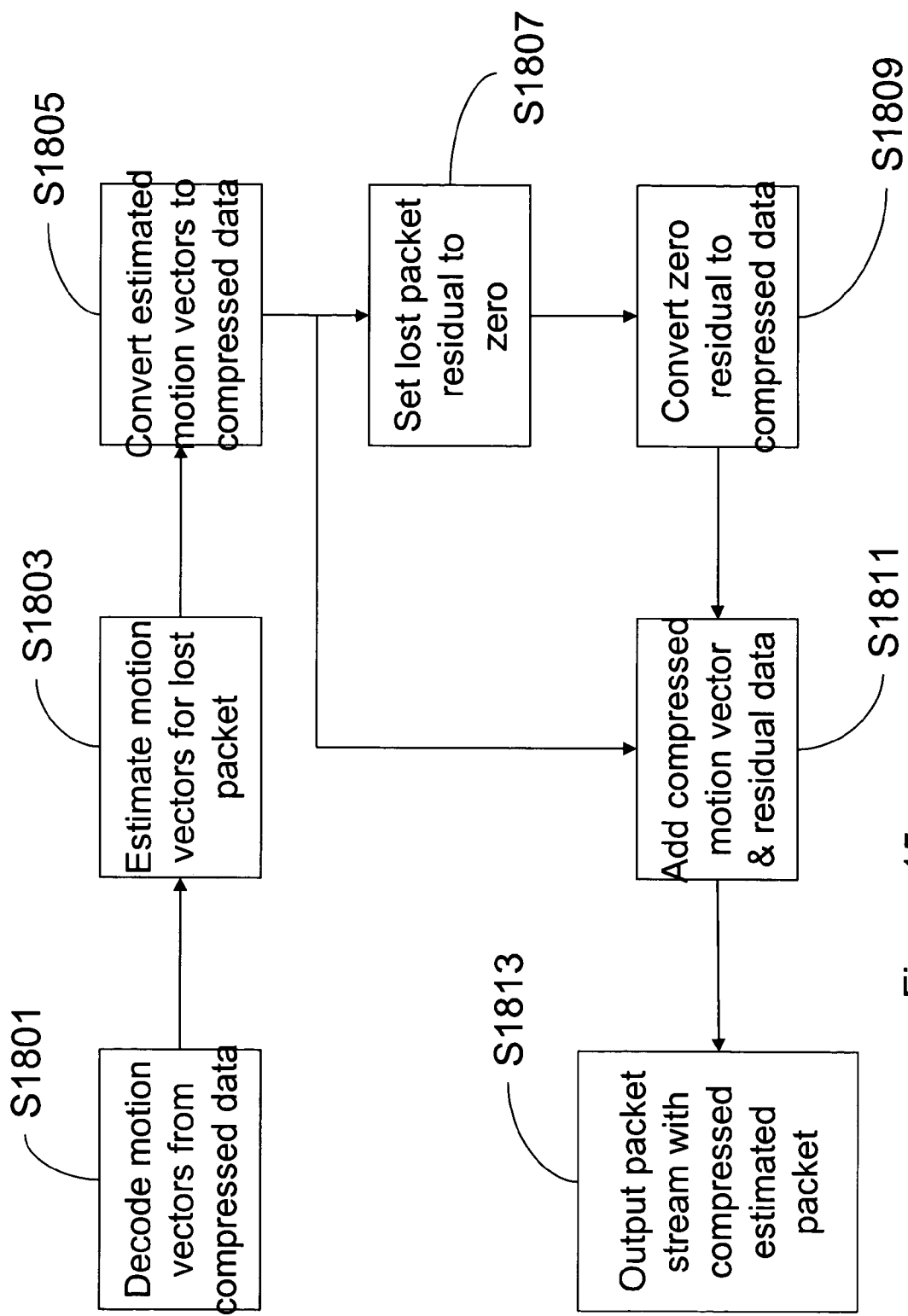
FIG. 15 is a flow diagram for concealment of corrupted packets corresponding to the device of FIG. 13.

The process of decompressing, estimating, and recompressing is shown in FIG. 15 as follows:

Step S1801—For each packet received, decompress the packet and decode the motion vectors from the compressed data;

Step S1803—For the lost packet, estimate the corresponding motion vectors, using the same method as for concealment described relative to FIG. 9;

Step S1805—Compress the estimated motion vectors;

Step S1807—Reset the corresponding residuals to a predetermined value (either zero or another value);

Step S1809—Compress the reset residuals;

Step S1811—Combine the compressed estimated motion vectors and compressed reset residuals to form an estimated packet; and Step S1813—Output the estimated packet for inclusion in the packet stream output by gateway or MCU 1705.

Apart from performing reliable loss detection and concealment, performing packet loss detection and concealment in the gateway or MCU also has the benefit of minimizing the round-trip delay associated with packet loss notifications and the corresponding encoder reply.

Figure 16:
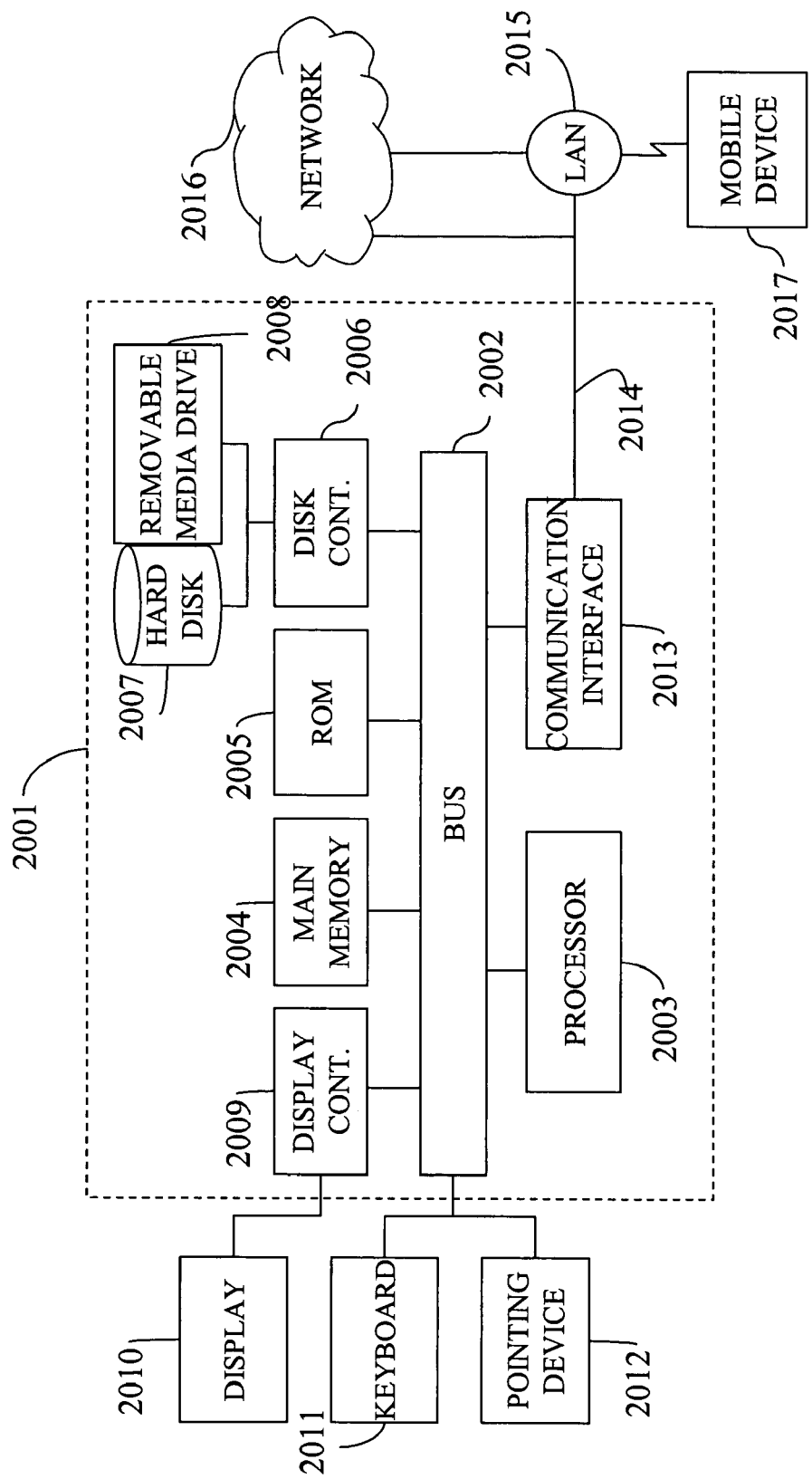
FIG. 16 is a block diagram of a computer associated with the present invention.

FIG. 16 is a block diagram of a computer system 2001 upon which an embodiment of the present invention may be implemented. It should be noted however, that the present system need not be based on a personal computer (PC) configuration, but rather a custom processor-based system (such as a software and/or hardware modified Tandberg 6000, or Tandberg MCU) that does not include the features of a general purpose computer may be used as well. Nevertheless, because the actual hardware configuration used to support the present invention, is not so restricted, an example of PC-based system is now provided. The computer system 2001 includes a bus 2002 or other communication mechanism for communicating information, and a processor 2003 coupled with the bus 2002 for processing the information. The computer system 2001 also includes a main memory 2004, such as a random access memory (RAM) or other dynamic storage device (e.g., dynamic RAM (DRAM), static RAM (SRAM), and synchronous DRAM (SDRAM)), coupled to the bus 2002 for storing information and instructions to be executed by processor 2003. In addition, the main memory 2004 may be used for storing temporary variables or other intermediate information during the execution of instructions by the processor 2003. The computer system 2001 further includes a read only memory (ROM) 2005 or other static storage device (e.g., programmable ROM (PROM), erasable PROM (EPROM), and electrically erasable PROM (EEPROM)) coupled to the bus 2002 for storing static information and instructions for the processor 2003.

The computer system 2001 also includes a disk controller 2006 coupled to the bus 2002 to control one or more storage devices for storing information and instructions, such as a magnetic hard disk 2007, and a removable media drive 2008 (e.g., floppy disk drive, read-only compact disc drive, read/write compact disc drive, compact disc jukebox, tape drive, and removable magneto-optical drive). The storage devices may be added to the computer system 2001 using an appropriate device interface (e.g., small computer system interface (SCSI), integrated device electronics (IDE), enhanced-IDE (E-IDE), direct memory access (DMA), or ultra-DMA).

The computer system 2001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 2001 may also include a display controller 2009 coupled to the bus 2002 to control a display 2010, such as a cathode ray tube (CRT), for displaying information to a computer user. The computer system includes input devices, such as a keyboard 2011 and a pointing device 2012, for interacting with a computer user and providing information to the processor 2003. The pointing device 2012, for example, may be a mouse, a trackball, or a pointing stick for communicating direction information and command selections to the processor 2003 and for controlling cursor movement on the display 2010. In addition, a printer may provide printed listings of data stored and/or generated by the computer system 2001.

The computer system 2001 performs a portion or all of the processing steps of the invention in response to the processor 2003 executing one or more sequences of one or more instructions contained in a memory, such as the main memory 2004. Such instructions may be read into the main memory 2004 from another computer readable medium, such as a hard disk 2007 or a removable media drive 2008. One or more processors in a multi-processing arrangement may also be employed to execute the sequences of instructions contained in main memory 2004. In alternative embodiments, hard-wired circuitry may be used in place of or in combination with software instructions. Thus, embodiments are not limited to any specific combination of hardware circuitry and software.

As stated above, the computer system 2001 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 2001, for driving a device or devices for implementing the invention, and for enabling the computer system 2001 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 2003 for execution. A computer readable medium may take many forms, including but not limited to, non-volatile media, volatile media, and transmission media. Non-volatile media includes, for example, optical, magnetic disks, and magneto-optical disks, such as the hard disk 2007 or the removable media drive 2008. Volatile media includes dynamic memory, such as the main memory 2004. Transmission media includes coaxial cables, copper wire and fiber optics, including the wires that make up the bus 2002. Transmission media also may also take the form of acoustic or light waves, such as those generated during radio wave and infrared data communications.

Various forms of computer readable media may be involved in carrying out one or more sequences of one or more instructions to processor 2003 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 2001 may receive the data on the telephone line and use an infrared transmitter to convert the data to an infrared signal. An infrared detector coupled to the bus 2002 can receive the data carried in the infrared signal and place the data on the bus 2002. The bus 2002 carries the data to the main memory 2004, from which the processor 2003 retrieves and executes the instructions. The instructions received by the main memory 2004 may optionally be stored on storage device 2007 or 2008 either before or after execution by processor 2003.

The computer system 2001 also includes a communication interface 2013 coupled to the bus 2002. The communication interface 2013 provides a two-way data communication coupling to a network link 2014 that is connected to, for example, a local area network (LAN) 2015, or to another communications network 2016 such as the Internet. For example, the communication interface 2013 may be a network interface card to attach to any packet switched LAN. As another example, the communication interface 2013 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 2013 sends and receives electrical, electromagnetic or optical signals that carry digital data streams representing various types of information.

The network link 2014 typically provides data communication through one or more networks to other data devices. For example, the network link 2014 may provide a connection to another computer through a local network 2015 (e.g., a LAN) or through equipment operated by a service provider, which provides communication services through a communications network 2016. The local network 2014 and the communications network 2016 use, for example, electrical, electromagnetic, or optical signals that carry digital data streams, and the associated physical layer (e.g., CAT 5 cable, coaxial cable, optical fiber, etc). The signals through the various networks and the signals on the network link 2014 and through the communication interface 2013, which carry the digital data to and from the computer system 2001 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 2001 can transmit and receive data, including program code, through the network(s) 2015 and 2016, the network link 2014, and the communication interface 2013. Moreover, the network link 2014 may provide a connection through a LAN 2015 to a mobile device 2017 such as a personal digital assistant (PDA) laptop computer, or cellular telephone.

Obviously, numerous modifications and variations of the present invention are possible in light of the above teachings. It is therefore to be understood that within the scope of the appended claims, the invention may be practiced otherwise than as specifically described herein.

The invention claimed is:

1. A video-conferencing system, comprising:

a decoder; an encoder connected to the decoder by a network;

a packet loss detection mechanism co-located with the decoder, the packet loss detection mechanism configured to detect a lost packet and to transmit one of a packet loss notification message and a lost packet identification message; and one of a sustained packet loss detection mechanism co-located with one of the encoder and the packet loss detection mechanism, the sustained packet loss detection mechanism configured to receive the packet loss notification message and to inform the encoder that the packet loss notification message indicates a presence of one of a first and a second predetermined packet loss scenario, and an error concealment device co-located with the decoder and connected to the packet loss mechanism, the error concealment device configured to replace motion vector data lost from a current frame with motion vector data from a previous frame in response to the lost packet identification message;

wherein the encoder is further configured to determine one of a reliability of a reference block and a change in a reference block mean value;

wherein the encoder is configured to determine a reliability of a reference block on the basis of a period since the reference block was last updated as INTRA; and wherein the encoder is configured to determine a reliability $R_n$ of a reference block in a frame n is determined as follows:

$R_n = 1-p$ for INTRA blocks;

$R_n = (1-p) R_{n-1}$ for INTER blocks with non-zero difference signal; and $R_n = R_{n-1}$ for INTER blocks with zero difference signals, where p is a packet loss probability and $R_{n-1}$ is one of a reliability of a same block in a previous frame and an expression dependent on a reliability of neighbor blocks that includes non-zero motion vectors effects.

2. The video-conferencing system of claim 1, wherein the encoder is configured to insert an INTER or INTRA block according to a first and a second insertion method if the packet loss notification message indicates the presence of the first and the second predetermined packet loss scenarios, respectively.

3. The video-conferencing system of claim 1, wherein the first predetermined packet loss scenario comprises:

a periodicity in a last N packet loss notifications that exceeds a predetermined packet loss periodicity value.

4. The video-conferencing system of claim 3, wherein the first predetermined packet loss scenario comprises:
at least K of N×N ratios which are less than a predetermined threshold t, where
$T_0, T_1, \ldots$ and $T_N$ are a set of time instances corresponding to a set of N most recent packet loss notifications;
$d_i$ is a plurality of time differences $d_0=T_1-T_0$, $d_1=T_2-T_1, \ldots d_{N-1}=T_N-T_{N-1}$ between packet loss notifications; and
the N×N ratios equal $r_{i,j}=|d_i|/|d_j|$ corresponding to every possible combination of two time differences.

5. The video-conferencing system of claim 1, wherein the encoder is configured to insert a plurality of INTRA blocks separated by a predetermined distance corresponding to a packet loss occurrence rate.

6. The video-conferencing system of claim 5, wherein the predetermined distance is configured to vary such that a higher packet loss occurrence rate results in a closer spacing of inserted INTRA blocks.

7. The video-conferencing system of claim 5, wherein the encoder is configured to update an entire picture using INTRA blocks during a predetermined number of frames.

8. The video-conferencing system of claim 7, wherein the encoder is configured to prevent a motion vector from pointing into an area of the entire picture that has not yet been updated by an INTRA block.

9. The video-conferencing system of claim 1, wherein the encoder is configured to take anticipated packet losses into account when making a decision between inserting an INTRA block and inserting an INTER block.

10. The video-conferencing system of claim 1, wherein the encoder is configured to determine a change in mean value, $MD_n$ for a block in a frame n as follows:

$$MD_n = |M_n - M_{n-1}|$$

where $M_n$ and $M_{n-1}$ are mean values of a block in frame n and n-1, respectively.

11. The video-conferencing system of claim 10, wherein the encoder is configured to determine a sum of absolute differences between original block pixels, $c(i,j)$ and pixels pointed to by a chosen motion vector, $p(i,j)$ as follows $$SAD_1 = \left[\sum_{i,j} |c(i,j) - p(i,j)|\right] [(ar+b)(c(1-R_n) + dpMD_n) + 1],$$

where r is a bit rate of a compressed video stream measured in kbps, p is a packet loss probability, and a, b, c, and d are empirically determined constants, corresponding to a communication system,
determine a sum of absolute differences between the original blocks of pixels and a mean value as follows $$SAD_2 = \sum_{i,j} |c(i,j) - M_n| + K,$$

where K is an empirically determined constant; and
insert the INTRA block if $SAD_2 < SAD_1$ or
insert the INTER block if $SAD_2 \geq SAD_1$.

12. The video-conferencing system of claim 11, wherein the encoder is configured to choose constants a, b, c, and d such that a penalty term increases with a change in mean value $MD_n$, the packet loss rate p, and the bit rate r, and decreases with reliability $R_n$.

13. The video-conferencing system of claim 1, wherein the error concealment device is configured to estimate a motion vector $V'_n(k,l)$ of a lost frame n in block position (k,l) with an actual motion vector $V_{n-1}(k,l)$ of a previous frame n-1 at block position (k,l).

14. The video-conferencing system of claim 13, wherein the error concealment device is configured to set a residual of the lost frame n to a predetermined residual value.

15. The video-conferencing system of claim 14, wherein the error concealment device is configured to set the residual of the lost frame n to zero.

16. A video-conferencing interface device connecting two networks, comprising:
a decoder connected to an upstream encoder by a first of the two networks;
an encoder connecting the decoder to a downstream decoder by a second of the two networks; a packet loss detection mechanism connected to the decoder configured to detect a lost packet and to transmit one of a packet loss notification message and a lost packet identifier; and
one of a sustained packet loss detection mechanism connected to the packet loss detection mechanism and the upstream encoder, the sustained packet loss detection mechanism configured to receive the packet loss notification message and to inform the upstream encoder that the packet loss notification message indicates a presence of one of a first and a second predetermined upstream packet loss scenario, and an error concealment device connected to the decoder and the packet loss detection mechanism, the error concealment device configured to replace a lost motion vector with a replacement motion vector from a previous frame;
wherein the encoder is further configured to determine one of a reliability of a reference block and a change in a reference block mean value;
wherein the encoder is configured to determine a reliability of a reference block on the basis of a period since the reference block was last updated as INTRA; and
wherein the encoder is configured to determine a reliability $R_n$ of a reference block in a frame n is determined as follows:
$R_n = 1-p$ for INTRA blocks;
$R_n = (1-p) R_{n-1}$ for INTER blocks with non-zero difference signal; and
$R_n = R_{n-1}$ for INTER blocks with zero difference signals, where
p is a packet loss probability and $R_{n-1}$ is one of a reliability of a same block in a previous frame and an expression dependent on a reliability of neighbor blocks that includes non-zero motion vectors effects.

17. The video-conferencing gateway device of claim 16, wherein
the encoder is connected to a second sustained packet loss notification device configured to identify a presence of a first and a second predetermined downstream packet loss scenario, the encoder further configured to insert an INTER or INTRA block according to one of a first and a second method corresponding to the presence of the first and the second predetermined downstream packet loss scenario.

* * * * *